(12) United States Patent
Gajdel et al.

(10) Patent No.: US 12,423,456 B2
(45) Date of Patent: Sep. 23, 2025

(54) SYSTEMS AND METHODS FOR CONNECTING TO PLURALITY OF SYSTEMS OF RECORD

(71) Applicant: STAN A.I. CORP., North York (CA)

(72) Inventors: Maximilian Gajdel, Whitby (CA); Bogdan Raic, Richmond Hill (CA)

(73) Assignee: STAN A.I. CORP., North York (CA)

( * ) Notice: Subject to any disclaimer, the term of this patent is extended or adjusted under 35 U.S.C. 154(b) by 0 days.

(21) Appl. No.: 18/963,681

(22) Filed: Nov. 28, 2024

(65) Prior Publication Data

US 2025/0272424 A1    Aug. 28, 2025

Related U.S. Application Data

(63) Continuation-in-part of application No. 18/675,005, filed on May 27, 2024.

(60) Provisional application No. 63/556,566, filed on Feb. 22, 2024.

(51) Int. Cl.
*G06F 21/62* (2013.01)
*G06F 16/334* (2025.01)

(52) U.S. Cl.
CPC ...... *G06F 21/6218* (2013.01); *G06F 16/3344* (2019.01)

(58) Field of Classification Search
None
See application file for complete search history.

(56) References Cited

U.S. PATENT DOCUMENTS

| | | | |
|---|---|---|---|
| 2001/0037407 A1 | 11/2001 | Dragulev et al. | |
| 2005/0227218 A1 | 10/2005 | Mehta et al. | |
| 2008/0243744 A1* | 10/2008 | Isaacs | G06F 16/243 706/46 |
| 2009/0157523 A1* | 6/2009 | Jones | G06Q 30/00 705/26.1 |
| 2012/0192253 A1 | 7/2012 | Betsch et al. | |
| 2012/0290531 A1 | 11/2012 | Kallakuri et al. | |
| 2013/0226546 A1 | 8/2013 | Suyeyasu et al. | |
| 2018/0004828 A1 | 1/2018 | Kathuria et al. | |
| 2020/0043087 A1* | 2/2020 | Burris | G06N 3/045 |
| 2021/0374886 A1 | 12/2021 | Reitz et al. | |
| 2023/0259821 A1 | 8/2023 | Travalini et al. | |

OTHER PUBLICATIONS

International Search Report and Written Opinion mailed May 15, 2025 in International Patent Application No. PCT/CA2025/050224.

\* cited by examiner

*Primary Examiner* — Brandon Hoffman

(57) ABSTRACT

Provided are computer-implemented systems and methods for connecting to plurality of systems of record. This includes receiving a user request from the user at a user device, transmitting the user request via a network, receiving a first output based on the user request, determining one or more actions, based on the one or more intent signals, each of the one or more intent signals identifying a user intent in the user request, determining a candidate system of record associated with the one or more actions, transmitting an automated request based on the one or more intent signals and the one or more actions, receiving a second output based at least on the one or more intent signals and the one or more actions, the second output comprising a response to the user request, determining a user response to the user request based on the second output.

21 Claims, 9 Drawing Sheets

SYSTEMS AND METHODS FOR CONNECTING TO PLURALITY OF SYSTEMS OF RECORD

CROSS-REFERENCE TO RELATED APPLICATION

This application is a continuation-in-part of U.S. application Ser. No. 18/675,005 filed on May 27, 2024, and claims the benefit of U.S. Provisional Application No. 63/556,566 filed on Feb. 22, 2024 the entirety of each of which are incorporated by reference herein.

FIELD

The present disclosure generally relates to methods and systems for property management using Large Language Models (LLMs), and more specifically, to identifying user intent and using an LLM model to respond to a user request based on the identified intent.

BACKGROUND

Property management involves providing services, such as repair, as well as information and support services to residents who are use properties for residential or commercial purposes. Property management organizations often manage many different buildings at the same time, and because of consolidation in the industry and ongoing labour shortages, the long term trend is increased management of properties by existing property management companies.

Residents may include tenants in rental units, homeowners in a Home-Owner's Association (HOA), owners and tenants of a unit in a condominium corporation or strata, residents in multifamily properties, etc.

Property management is an intricate business and individual buildings (e.g. single family homes or townhomes) may each have individual rules, regulations, and challenges. These buildings each include individual corpuses of documents, including technical documents such as floorplans and architectural drawings, legal documents such as regulations, manuals such as appliance manuals, repair guidelines, and other types of documents.

In addition to these document corpuses, a property management company also operates using a significant number of systems of record, which may be internal or external to the property management company. These systems of record may include data relevant to the residents or functionality that may be required in the service of requests from residents.

Historically, property management companies have had technical challenges with providing services to residents because of the large and individual document corpuses as well as the variety of different systems of record that might be involved in servicing a request from a resident. These technical challenges may be further exacerbated by various state and provincial legal regimes (e.g. in Arizona, service vendor bids follow a closed envelope system so the board can't see the name of the vendors proposing work). These technical challenges result in poor response times and unmet needs of residents, especially after hours and when there is a large number of requests to a property manager at the same time which may result in wait times on the phone or by email.

Building and sustaining resident relationships is a cornerstone of success for any business. Yet, as the roster of buildings and their residents grows, so do the challenges in meeting their increasingly similar yet individual demands. It is highly desirable with modern property management to provide individualized and efficient support for residents. For example, the contractual terms that a tenant may have agreed to may differ and thus the tenants may require differential treatment in certain situations. Similarly, condominium residents may have differing entitlements to common elements such as patios. The sheer volume of resident inquiries poses a challenge for maintaining personalized, attentive, and timely interactions. The risk of oversight or delays in response looms large, potentially jeopardizing the quality and depth of these critical connections.

There is a need for improved automated systems that can address the explosion of documents, the plethora of systems of record, and as well ensure consistent and timely responses tailored to specific resident needs. By leveraging technology to manage routine aspects, businesses can free up valuable time and resources, enabling property management companies to focus on larger issues that require human intervention.

SUMMARY

The following summary is intended to introduce the reader to various aspects of the detailed description, but not to define or delimit any invention.

The present disclosure provides systems and methods that can address technical challenges faced within the property management industry. The present disclosure provides an interface which can receive, as an input, a request from a tenant and generate an output which provides a response to the question. The interface may have different types of inputs, for example it may have a web user interface that submits requests to the API, it may receive text messages, emails, or other direct communications from a user. The interface may respond to requests that would normally be handled manually by the property manager and provides prompt and accurate responses to the resident. The property manager may receive and respond to the requests that cannot be handled autonomously, reducing the overall workload.

The interface can include an omnichannel interface that can receive an omnichannel request as an input. That is, the interface can receive a user request by text, email, call, web chat, social media message, in-app message, WhatsApp, etc. The input is received by the system via API through the respective channel.

The language model may receive the input and processes the message in two stages. At the first stage, the intent of the message can be determined, for example using Google's Dialogflow engine. At the second stage, the model may generate a response based on the intent of the message. Generating a response can entail generating a text-only answer, an integration answer, a text and integration answer or a no answer available response.

A text-only answer may be generated using information located in a knowledge base. The knowledge base may be generated using an automatic onboarding process that scans a corpus of community specific documents and data to extract text answers and other text data and uploads them into the knowledge base for each organization (i.e. organization and/or property-specific data stored in a database). The documents can include printed files, electronic documents, and documents from a property management software including data from web pages and other data sources. The system may perform a second query based on the resident input using a generative LLM model (e.g. GPT4). The system may fetch the answer, summarize it, and generate a professional human-like response that is returned to the user. The system can return the response to the user via the same channel that the message was submitted (e.g. text message).

The systems and methods may integrate with the one or more systems of record to provide updating and writing functions, as described herein.

If an answer cannot be found in the knowledge base, the systems and methods can automatically escalate the inquiry to a human such as a manager by sending a notification to the manager. The property manager may provide a response to the system directly. The system passes on the response to the resident who submitted the message. The system can also store the property manager's response to the knowledge base for future queries of the same kind, meaning that the property manager need only respond to each unique question once.

The system of record integration allows a resident to send requests and update records through the same omnichannel interface that retrieves information and generates answers to questions. The resident need only enter plain text messages into the system to complete a variety of tasks. The resident does not access the property management system directly, which can be a convoluted or timely process.

During the automatic onboarding process, system of record integration can be set up with the property manager's system of record using specific API credentials. After setup, the system has access to the system of record for retrieving information and inputting or updating information.

After a message is received from the resident, the intent is determined as described herein. If the identified intent of the resident message requires integration with the manager's system of record, the system will send an API call to the system of record. The API call can request information (e.g. a live account balance), create a record (e.g. submit a work order), or update/edit existing records (e.g. update a work order with additional info or update the contact information of a resident). The identity of the resident who submitted the message is verified using separate API calls to the system of record.

In a first aspect, there is provided a computer-implemented method for connecting to plurality of systems of record, the method comprising: receiving, at a network device, a user request from a user at a user device; transmitting, from the network device to an intent determining system, the user request via a network; receiving at the network device from the intent determining system, a first output based on the user request, wherein the first output is associated with one or more intent signals; determining at a processor in communication with the network device, one or more actions, based on the one or more intent signals, each of the one or more intent signals identifying a user intent in the user request; determining at the processor, a candidate system of record from the plurality of systems of record, the candidate system of record associated with the one or more actions; transmitting from the network device to the candidate system of record, an automated request based on the one or more intent signals and the one or more actions; receiving, from the candidate system of record via the network device, a second output based at least on the one or more intent signals and the one or more actions, the second output comprising a response to the user request; determining, at the processor, a user response to the user request based on the second output; and outputting, using the network device, the response to the user request.

The method may further include: determining, at the processor, a database, the database including a corpus of data and/or documents associated with a property.

The method may further include determining, at the processor in communication with the network device, that no actions match the associated one or more intent signals; transmitting, to a manager user, a notification via a manager network device; receiving, from the manager user, a second output via a manager network device, including a response to the user request; and transmitting, to the database via the network, the second output.

Determining, at a processor in communication with the network device, one or more actions may include at least one of: retrieving a status update, updating an existing record, creating a work order, creating a budget, and summarizing a contract.

The method may further include outputting, using the network device, a notification when one or more of the actions is completed.

Transmitting, from the network device to the candidate system of record, an automated request based on the one or more intent signals and the one or more actions may include using an application programming interface (API) call, a fetch and write program, and robotic process automation (RPA).

The network device may include a text platform, an e-mail platform, a calling platform, a web-based platform, or an in-app messaging platform.

The user request may include a prompt related to property management.

Receiving, from the candidate system of record via the network device, the second output, may include receiving information from a homeowner's association (HOA).

The candidate system of record may be an enterprise resource planning system, a financial system, a document management system, an inventory management system, and a compliance system.

Outputting at the network device, the response to the user request may include sending an e-mail, sending a message in a chatbot, or sending a message in a messaging platform.

In a further aspect, there is provided a system for connecting to plurality of systems of record, the system comprising: a network device; and a processor in communication with the network device configured to: receive, at the network device, a user request from a user at a user device; transmit, from the network device to an intent determining system, the user request via a network; receiving, at the network device from the intent determining system, a first output based on the user request, wherein the first output is associated with one or more intent signals; determine, at the processor in communication with the network device, one or more actions, based on the one or more intent signals, each of the one or more intent signals identifying a user intent in the user request; determine, at the processor, a candidate system of record in the plurality of systems of record, the candidate system of record associated with the one or more actions; transmit, from the network device to the candidate system of record, an automated request based on the one or more intent signals and the one or more actions; receive, from the candidate system of record via the network device, a second output based at least on the one or more intent signals and the one or more actions, the second output comprising a response to the user request; determine, at the processor, a user response to the user request based on the second output; and output, using the network device, the response to the user request.

The processor may be further configured to: determine, at the processor, a database, the database including a corpus of data and/or documents associated with a property.

The processor may be further configured to: determine, at the processor in communication with the network device, that no actions match the associated one or more intent signals; transmit, to a manager user, a notification via a manager network device; receive, from the manager user, a second output via a manager network device, including a response to the user request; and transmit, to the database via the network, the second output.

The one or more actions may include at least one of: retrieving a status update, updating an existing record, creating a work order, creating a budget, and summarizing a contract.

The processor may be further configured to: output, using the network device, a notification when one or more of the actions is completed.

The processor, in response to transmitting, from the network device to the candidate system of record, the automated request based on the one or more intent signals and the one or more actions, may be further configured to: use an application programming interface (API) call, a fetch and write program, and robotic process automation (RPA).

The network device may include a text platform, an e-mail platform, a calling platform, a web-based platform, or an in-app messaging platform.

The user request may include a prompt related to property management.

The processor, in response to receiving from the candidate system of record via the network device, the second output, may be further configured to receive information from a homeowner's association (HOA).

The candidate system of record may include an enterprise resource planning system, a financial system, a document management system, an inventory management system, and a compliance system.

The processor, in response to outputting at the network device, the response to the user request may be further configured to send an e-mail, send a message in a chatbot, and send a message in a messaging platform.

The systems and methods of the present disclosure can also retrieve user-related data prior to determining an intent associated with a user request. This may allow the system to respond to user requests from a particular user more rapidly and more efficiently.

In response to receiving a user request from a user, the server processor can retrieve user-related data from one or more systems of records containing information related to the user (e.g., a live account balance, a rental payment due date) including data relating to the property or properties associated with the user. For example, the server processor can make a call to all API endpoints to retrieve the user-related data from the corresponding databases.

The retrieved user-related data can be temporarily stored in a user session database during the course of the user's interaction with the user response platform. The user-related data can thus be pre-loaded to be used throughout the resident's interaction with the omnichannel platform. This may allow the system to more readily provide response to a user (i.e., less delay between a user request and a user response), as the system will not need to send an API call after every request.

The system may also operate concurrent communication sessions with multiple users. User-related data can be pre-fetched or pre-loaded for the corresponding user for each communication session. Following the completion of a communication session, the pre-loaded data may be deleted from the session database, e.g. to free up local storage resources for a user session for another user.

In an aspect of the present disclosure, there is provided a computer-implemented method for responding to user queries requiring access to data stored in one or more systems of record from amongst a plurality of systems of record, the method comprising: receiving, by a server processor through an omnichannel interface, a user request from a user device over a first communication channel, the user request including a user-defined request relating to a residential or commercial property associated with a user associated with the user request; determining, by the server processor, user identification data for the user based on pre-processing of the user request; retrieving, from one or more record system databases storing the systems of record, user-specific data related to the user or the residential or commercial property associated with the user; temporarily storing the user-specific data in a local database accessible to the server processor; determining, by the server processor, request data response based on the user request, the request data response comprising at least some of the user-specific data stored in the local database; determining, by the server processor, a user response to the user request based on the request data response; and transmitting, by the processor to the user device, the user response to the user request using the first communication channel.

The method can include authenticating the user prior to retrieving the user-specific data.

The method can include initiating, by the server processor, a user request session in response to receiving the user request; and associating the local database storing the user-specific data with the user request session.

The method can include terminating the user request session following the transmission of the user response to the user device.

The user request session can be terminated by the server processor in response to receiving a session complete message from the user device over the first communication channel.

The method can include removing the user-specific data from the local database following termination of the user request session.

The method can include receiving, by the server processor, a subsequent user request from the user device during the user request session; determining, by the server processor, subsequent request data response based on the subsequent user request, the subsequent request data response including at least some of the user-specific data stored in the local database; determining, by the server processor, a subsequent user response to the subsequent user request based on the subsequent request data response; and transmitting, by the server processor to the user device, the subsequent user response to the subsequent user request using the first communication channel.

The method can include receiving, by the server processor, an additional user request from a second user device, the additional user request including an additional user-defined request relating to an additional residential or commercial property associated with an additional user associated with the additional user request; initiating, by the server processor, an additional user request session in response to the additional user request; determining, by the server processor, additional user identification data for the additional user based on pre-processing of the additional user request; retrieving, from the one or more record system databases storing the systems of record, additional user-specific data related to the additional user or the additional residential or commercial property associated with the additional user; and temporarily storing the additional user-specific data in an additional local database accessible to the server processor during the additional user request session.

The server processor can provide the user request session and the additional user request session concurrently.

The method can include determining, by the server processor, one or more specific user intents defined by the user request, where the one or more specific user intents are determined by providing the user request and the user identification data as inputs to one or more intent determining processors operable to use at least one of a natural language processing model or a large language model to determine an intent associated with the user request; and determining, by the server processor, request-related data required to respond to the user request based on the one or more specific user intents, where the request-related data includes the at least some of the user-specific data stored in the local database; and determining the request data response using the request-related data.

In an aspect of this disclosure, there is provided a system for responding to user queries requiring access to data stored in one or more systems of record from amongst a plurality of systems of record, the system comprising: a processor; and a non-transitory storage memory having stored thereon a local database in communication with the server processor; wherein the processor is configured to: receive through an omnichannel interface, a user request from a user device over a first communication channel, the user request including a user-defined request relating to a residential or commercial property associated with a user associated with the user request; determine user identification data for the user based on pre-processing of the user request; retrieve from one or more record system databases storing the systems of record, user-specific data related to the user or the residential or commercial property associated with the user; temporarily store the user-specific data in the local database; determine a request data response based on the user request, the request data response comprising at least some of the user-specific data stored in the local database; determine a user response to the user request based on the request data response; and transmit, to the user device, the user response to the user request using the first communication channel.

The processor can be configured to: authenticate the user prior to retrieving the user-specific data.

The processor can be configured to: initiate a user request session in response to receiving the user request; and associate the local database storing the user-specific data with the user request session.

The processor can be configured to: terminate the user request session following the transmission of the user response to the user device.

The processor can be configured to terminate the user request session in response to receiving a session complete message from the user device over the first communication channel.

The processor can be configured to remove the user-specific data from the local database following termination of the user request session.

The processor can be configured to receive a subsequent user request from the user device during the user request session; determine a subsequent request data response based on the subsequent user request, the subsequent request data response including at least some of the user-specific data stored in the local database; determine a subsequent user response to the subsequent user request based on the subsequent request data response; and transmit, to the user device, the subsequent user response to the subsequent user request using the first communication channel.

The processor can be configured to receive an additional user request from a second user device, the additional user request including an additional user-defined request relating to an additional residential or commercial property associated with an additional user associated with the additional user request; initiate an additional user request session in response to the additional user request; determine additional user identification data for the additional user based on pre-processing of the additional user request; retrieve, from the one or more record system databases storing the systems of record, additional user-specific data related to the additional user or the additional residential or commercial property associated with the additional user; and temporarily store the additional user-specific data in an additional local database accessible to the server processor during the additional user request session.

The processor can be configured to provide the user request session and the additional user request session concurrently.

The processor can be configured to determine one or more specific user intents defined by the user request, where the one or more specific user intents are determined by providing the user request and the user identification data as inputs to one or more intent determining processors operable to use at least one of a natural language processing model or a large language model to determine an intent associated with the user request; and determine request-related data required to respond to the user request based on the one or more specific user intents, where the request-related data includes the at least some of the user-specific data stored in the local database; and determine the request data response using the request-related data.

In a further aspect, there is provided a computer-implemented method for improving connection to a plurality of systems of record, the method comprising: receiving, at a network device, a user request from a user at a user device; retrieving, from one or more systems of record, data related to the user; determining, at the processor, an output based on the user request, the output comprising at least one datum from the one or more systems of record; determining, at the processor, a user response to the user request based on the output; and outputting, using the network device, the response to the user request.

The method may include determining, at the processor in communication, that no output can be generated based on the data retrieved from the one or more systems of record; transmitting to a manager user, a notification via a manager network device; receiving, from the manager user, a second output via a manager network device, including a response to the user request; transmitting, to the database via the network, the second output.

The method may include determining, at a processor in communication with the network device, one or more outputs that include at least one of: retrieving a status update, updating an existing record, creating a work order, creating a budget, and summarizing a contract.

The method may include outputting, using the network device, a notification when one or more of the outputs is completed.

The method may include retrieving, from one or more systems of record, data related to the user, using an application programming interface (API) call, a fetch and write program, and robotic process automation (RPA).

The network device may include a text platform, an email platform, a calling platform, a web-based platform, or an in-app messaging platform.

The user request may include a prompt related to property management.

The method may include retrieving, from the one or more systems of record, data related to the user by receiving information from a homeowner's association (HOA).

The method may include outputting at the network device, the user response to the user request by sending an email, sending a message in a chatbot, or sending a message in a messaging platform.

The one or more systems of record may include an enterprise resource planning system, a financial system, a document management system, an inventory management system, and a compliance system The method may include outputting at the network device, the response to the user request by sending an email, sending a message in a chatbot, or sending a message in a messaging platform.

In a further aspect, there is provided a system for improving connection to a plurality of systems of record, the system comprising: a network device, and a processor in communication with the network device configured to: receive, at the network device, a user request from a user at a user device; retrieve, from one or more systems of record, data related to the user; determine, at the processor, an output based on the user request, the output comprising at least one datum from the one or more system of record; determine, at the processor, a user response to the user request based on the output; and output, using the network device, the response to the user request.

The processor may be further configured to determine that no output can be generated based on the data retrieved from the one or more systems of record; transmit, to a manager user, a notification via a manager network device; receive, from the manager user, a second output via a manager network device, including a response to the user request; transmit, to the database via the network, the second output.

The processor may be further configured to determine, a database including a corpus of data and/or documents associated with a property.

The one or more outputs may include at least one of: retrieving a status update, updating an existing record, creating a work order, creating a budget, and summarizing a contract.

The processor may be further configured to output, using the network device, a notification when one or more of the outputs is completed.

The processor may be further configured to retrieve, from one or more systems of record, data related to the user, using an application programming interface (API) call, a fetch and write program, and robotic process automation (RPA).

The network device may include a text platform, an email platform, a calling platform, a web-based platform, or an in-app messaging platform.

The user request may include a prompt related to property management.

The processor can be further configured to receive information from a homeowner's association (HOA), a condo corporation, a strata corporation, a rental organization.

The one or more systems of record may include an enterprise resource planning system, a financial system, a document management system, an inventory management system, and a compliance system.

The processor can be further configured to output the user response by sending an email, sending a message in a chatbot, or sending a message in a messaging platform.

It will be appreciated by a person skilled in the art that an apparatus, computer program product, system, or method disclosed herein may embody any one or more of the features contained herein and that the features may be used in any particular combination or sub-combination.

Other features and advantages of the present application will become apparent from the following detailed description. It should be understood, however, that the detailed description and the specific examples, while indicating embodiments of the application, are given by way of illustration and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION

Figure 1:
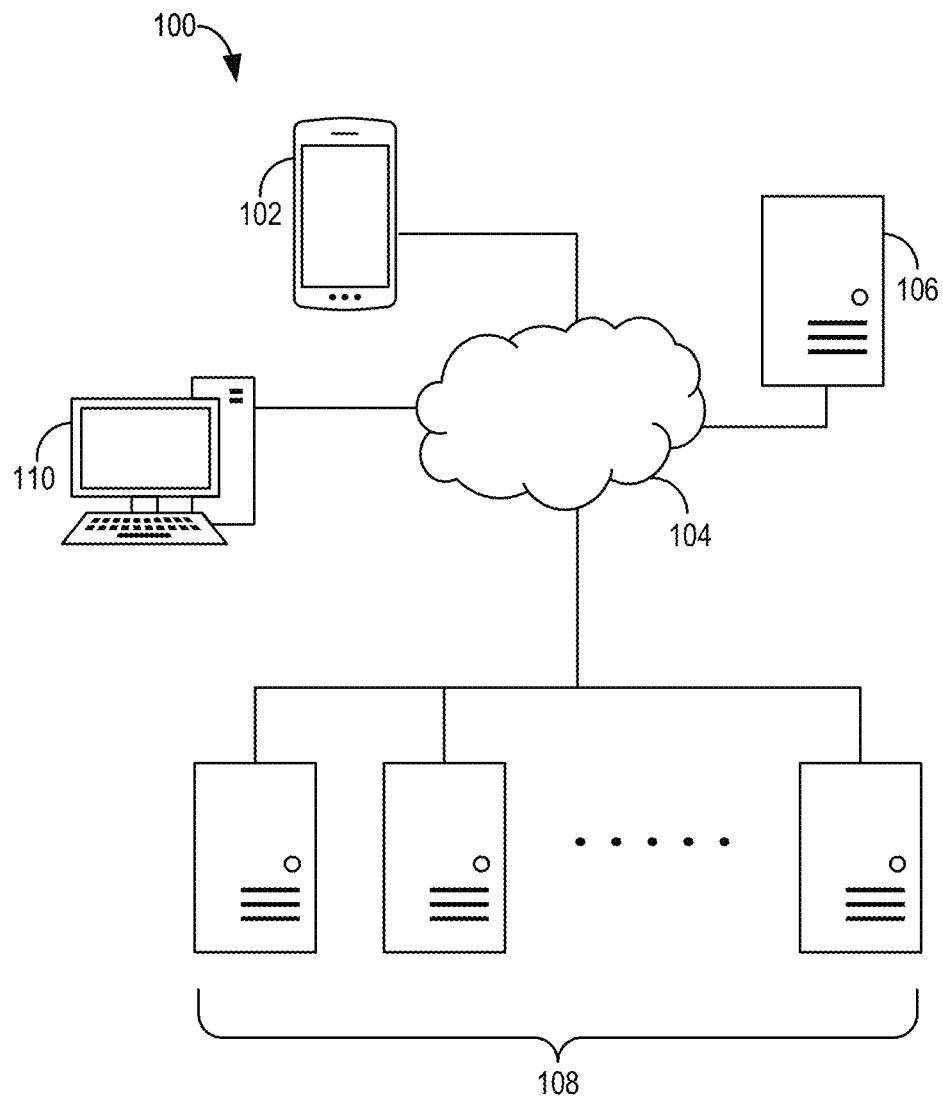
FIG. 1 shows a system diagram of an example property management application.

Various apparatuses or methods will be described below to provide an example of the claimed subject matter. No example described below limits any claimed subject matter and any claimed subject matter may cover methods or apparatuses that differ from those described below. The claimed subject matter is not limited to apparatuses or methods having all of the features of any one apparatus or methods described below or to features common to multiple or all of the apparatuses or methods described below. It is possible that an apparatus or methods described below is not an example that is recited in any claimed subject matter. Any subject matter disclosed in an apparatus or methods described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein.

Also, the description is not to be considered as limiting the scope of the examples described herein.

It should also be noted that the terms "coupled" or "coupling" as used herein can have several different meanings depending on the context in which these terms are used. For example, the terms "coupled", or "coupling" can have a mechanical, electrical or communicative connotation. For example, as used herein, the terms "coupled", or "coupling" can indicate that two elements or devices can be directly connected to one another or connected to one another through one or more intermediate elements or devices via an electrical element, electrical signal or a mechanical element depending on the particular context. Furthermore, the term "communicative coupling" indicates that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Some elements herein may be identified by a part number, which is composed of a base number followed by an alphabetical or subscript-numerical suffix (e.g., $112a$, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., $112$).

The example systems and methods described herein may be implemented in hardware or software, or a combination of both. In some cases, the examples described herein may be implemented, at least in part, by using one or more computer programs, executing on one or more programmable devices comprising at least one processing element, a data storage element (including volatile and non-volatile memory and/or storage elements), and at least one communication interface. These devices may also have at least one input device (e.g., a keyboard, a mouse, a touchscreen, an audio input device for voice prompt input and the like), and at least one output device (e.g., a display screen, a printer, a wireless radio, and the like) depending on the nature of the device. For example, and without limitation, the programmable devices (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some examples, the communication interface may be a network communication interface. In examples in which elements are combined, the communication interface may be a software communication interface, such as those for inter-process communication (IPC). In still other examples, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high-level procedural, declarative, functional or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Examples of the system may also be considered to be implemented as a non-transitory computer-readable storage medium, configured with a computer program, where the storage medium so configured causes a computer to operate in a specific and predefined manner to perform the functions described herein.

Furthermore, the example system, processes and methods are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various examples of systems, methods and computer programs products are described herein. Modifications and variations may be made to these examples without departing from the scope of the invention, which is limited only by the appended claims. Also, in the various user interfaces illustrated in the figures, it will be understood that the illustrated user interface text and controls are provided as examples only and are not meant to be limiting. Other suitable user interface elements may be used with alternative implementations of the systems and methods described herein.

To this end, it has been appreciated that there is a need for improved systems and methods for providing services to residents, including connecting to systems of record based on identified intent.

Reference is now made to FIG. 1, which shows a block diagram of an example system 100 for generating responses to user requests. In system 100, user requests can be received via a communication channel and the system can provide an interface with a one or more LLMs, or other generative models. The one or more LLMs may be used, for example, for various predefined tasks, such as determining an intent or action associated with a user request and the completion and/or summarization of a response to a user.

As shown, the property management system 100 includes one or more user devices 102, a network 104, one or more servers 106, one or LLMs or generative models 108, and one or more developer devices 110.

The one or more user devices 102 may be used by a user such as a tenant or resident including a homeowner, a residential tenant, property manager, commercial tenant etc. or another end-user. The one or more user devices 102 may any two-way communication device with capabilities to communicate with other devices. A user device 102 may be, for example, a mobile device such as mobile devices running the Google® Android® operating system or Apple® iOS® operating system. A user device 102 may also be, for example, a personal computer operating the Windows® or MacOS® operating system.

The one or more user devices 102 may be the personal device of a user. The one or more user devices 102 may be used by a user to access the property management software application (not shown) running on server 106 over network 104. The user device 102 may be a desktop computer, mobile device, or laptop computer. The user device may alternatively be a home assistant device such as Amazon® Alexa®, Google® Home®, or Apple® Siri®. The user device 102 may be in communication with server 106. The user device 102 may send and receive requests to the server 106 using different types of communication channels including text, email, via phone call or Voice-over-Internet-Protocol (VoIP), web application, chat application, social media message, etc.

The user device may alternatively be a landline, or cell phone that is used by a user to dial a number and interact with the server 106 via voice prompts.

The server 106 provides a web application, that may be used to provide the user with the functionality described herein using a web interface from server 106. The web interface from server 106 may include one or more user interfaces, including, but not limited to, the example user interfaces shown in FIGS. 5A-5D.

The server 106 may provide an Application Programming Interface (API) endpoint to the user device 102, which may be used by an application running on the user device 102 to provide the functionality described herein. The server 106 can provide, or operate in conjunction with, an omnichannel communication interface to enable different communication channels to access the functionality provided by the server 106. For example, the API running on the server 106 may use a 3rd party service such as Twilio® to interact with the user device, for example, to provide the functionality described herein by text message, WhatsApp® chat, phone call, or VoIP call. The server 106 may provide one or more databases that may be queried by the software applications running on the user devices 102.

The software application running on the one or more user devices 102 may display one or more user interfaces on a display device of the user device, including, but not limited to, the user interfaces shown in FIGS. 5A-5D. A browser may be used at the user device 102 to access the web application running on server 106.

Alternatively or in addition, the software application used by the user of the one or more user device 102 may be an email client such as Google® Gmail® or others as are known. This can enable emails to be sent and received with the server 106.

Alternatively or in addition, the software application used by the user of the one or more user devices 102 may be a Simple Message Service (SMS) client, and the user may send and receive SMS messages with server 106.

Network 104 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The server 106 is in network communication with the one or more user devices 102, the one or more generative models 108, and the one or more developer devices 110. The server 106 may host a web application or an Application Programming Interface (API) endpoint that the one or more user devices 102 and the one or more developer devices 110 may interact with via network 104. The requests made to the API endpoint of server 106 may be made in a variety of different formats, such as JavaScript Object Notation (JSON) or extensible Markup Language (XML). The server 106 may be a physical server, or may be provided using Amazon® AWS®. The server 106 may also provide database functionality for the user devices 102 and the developer devices 110 in addition to the API.

The one or more generative models 108 run on servers (i.e. one or more server processors) that are in network communication with the server 106. The generative models may be accessed by the server 106 using an API of the generative models 108. The generative models 108 may use a pre-trained AI model (e.g. GPT-4 or similar) to process inputs from the user device 102 via the server 106 and produce outputs for display on the user device 102. Detailed prompts and predefined crafted prompts provided by the server 106 may enable the models 108 to adapt to the volume and type of input data without making any modifications to its base model. The one or more generative models 108 may include one or more Large Language Models (LLMs), one or more Image Generation Models (IGMs), and one or more Speech Models (SMs).

The one or more generative models 108 may include one or more of the following GPT-2 made by OpenAIR, GPT-3 made by OpenAIR, GPT-3.5 Turbo made by OpenAIR, Claude 1 made by Anthropic®, Claude 2 made by Anthropic®, BLIP made by Salesforce®, LaMDA (Language Models for Dialog Applications) made by Google®, LLAMA (Large Language Model Meta AI) made by Meta®, GPT-4 made by OpenAIR, GPT-4 Turbo made by OpenAIR®, PaLM 2 (Pathways Language Model 2) Google®, Llama 2 made by Meta®, SDXL made by Stability AI®, Dall-E made by OpenAIR, Google Cloud Platform by Google®, ElevenLabs®, D-IDR.

The one or more developer devices 110 may be desktop computers or laptop computers that are in network communication with server 106 and may be used for the configuration and administration of the application on server 106.

Figure 2:
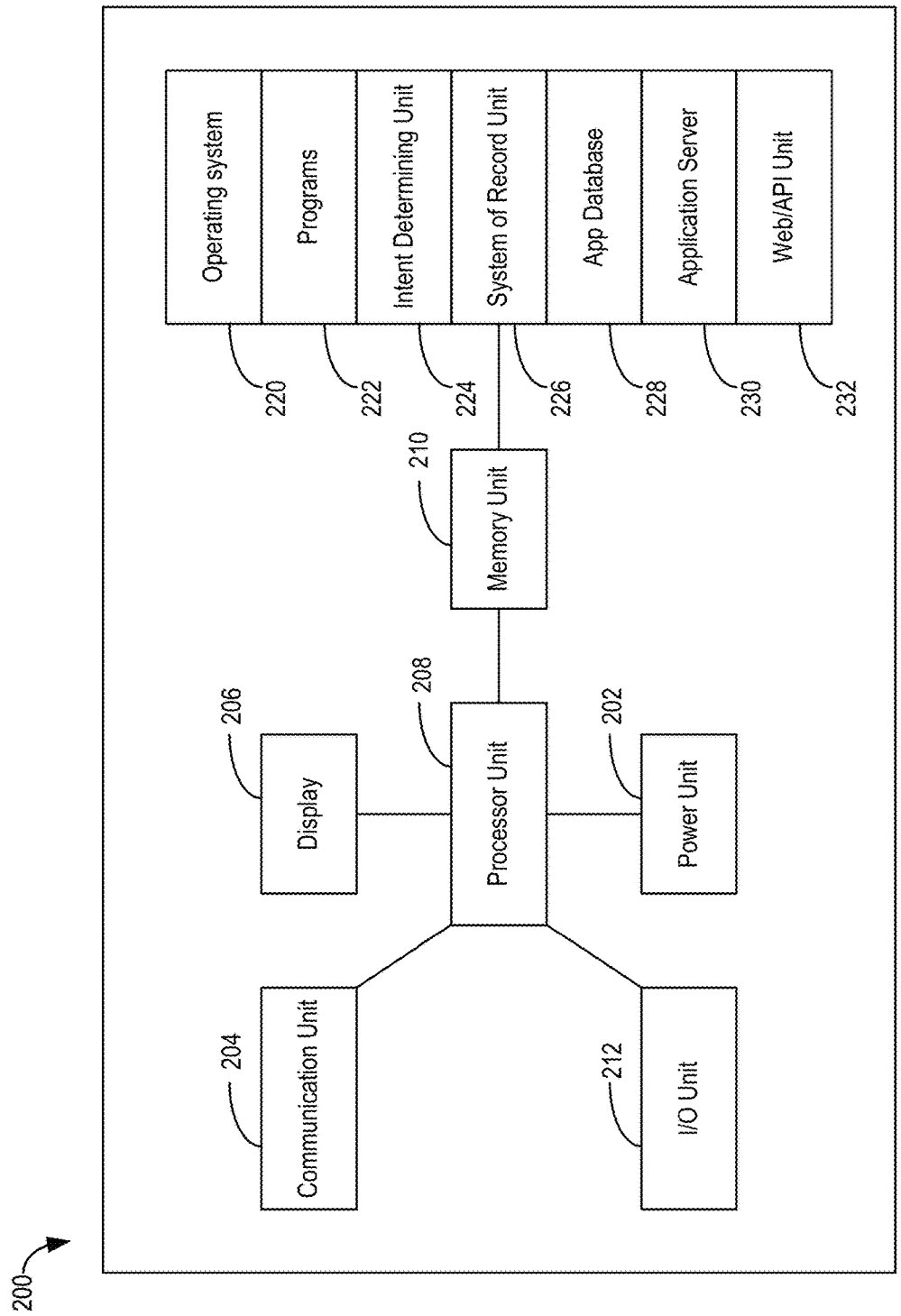
FIG. 2 shows an example device diagram.

Referring next to FIG. 2, which shows an example device diagram 200. The device drawing 200 includes communication unit 204, the display 206, the processor unit 208, the memory unit 210, the I/O unit 212, and the power unit 202. The example device 200 shown in FIG. 2 may be used as the server 106 in an example of system 100.

The communication unit 204 can include wired or wireless network connection capabilities. The communication unit 204 can include a radio that communicates using standards such as IEEE 802.11a, 802.11b, 802.11g, or 802.11n. The communication unit 204 can be used by the server 106 to communicate with other devices or computers. Communication unit 204 may communicate with a network, such as network 104 (see FIG. 1).

The display 206 may be an LED or LCD based display and may be a touch sensitive user input device that supports gestures.

The processor unit 208 controls the operation of the server 106. The processor unit 208 can be any suitable processor, controller or digital signal processor that can provide sufficient processing power depending on the configuration, purposes and requirements of the server 106 as is known by those skilled in the art. For example, the processor unit 208 may be a high-performance general processor. Alternatively or in addition, the processor unit 208 can include more than one processor with each processor being configured to perform different dedicated tasks. The processor unit 208 may include a standard processor, such as an Intel® processor or an AMD® processor.

The memory unit 210 comprises software code for implementing an operating system 220, programs 222, intent determining system 224, System of Record Unit 226, Application Database 228, Application Server 230, and Web/API Unit 230.

The memory unit 210 can include RAM, ROM, one or more hard drives, one or more flash drives or some other suitable data storage elements such as disk drives, etc. The memory unit 210 is used to store an operating system 220 and programs 222 as is commonly known by those skilled in the art. The memory unit 210 further includes an intent determining unit 224, a system of record unit 226, an application database 228, an application server 230, and a web/API unit 232.

The I/O unit 212 can include at least one of a mouse, a keyboard, a touch screen, a thumbwheel, a trackpad, a trackball, a card-reader, an audio source, a microphone, voice recognition software and the like again depending on the particular implementation of the server 106. In some cases, some of these components can be integrated with one another.

The power unit 216 can be any suitable power source that provides power to the server 106 such as a power adaptor or a rechargeable battery pack depending on the implementation of the server 106 as is known by those skilled in the art.

The operating system 220 may provide various basic operational processes for the server 200. For example, the operating system 220 may be a server operating system such as Ubuntu@ Linux, Microsoft® Windows Server® operating system, or another operating system.

The programs 222 include various user programs. They may include several hosted applications delivering services to users over the network, for example, a marketing customer relations management (CRM) system.

The intent determining unit 224 is configured to assess a user-specific intent associated with a request received from a user device 102. The intent determining unit 224 may transmit and receive requests to an intent determining system (e.g. one or more intent determining processors configured to provide a natural language processing model and/or a large language model) based on the user request using the communication unit 204. For example, the intent determining unit 224 may receive a user request including a text portion from the application server 230. The received user request may be stored in application database 228. The intent determining unit 224 may pre-process the user request prior to sending to the intent determining system.

The intent determining system may include, for example, one or more processors operable to execute a natural language processing function such as Google® Dialogflow® for example. Alternatively or in addition, the intent determining system may include, for example, a Large-Language Model (LLM) such as one of the one or more generative models 108 (e.g. FIG. 1). The intent determining system may respond to the intent determining unit 224 with one or more intent signals. The intent signals may provide information about one or more specific user intents corresponding to the user request. These specific user intents that may be used by the intent determining unit 224 to identify one or more actions that need to be performed to respond to the user request and/or request-related data required to respond to the user request based on the one or more specific user intents.

The identified intent of the user request may require request-related data from a system of record associated with a user and/or a property. The database(s) storing the systems of record for a particular property associated with the user who is submitting the user request may be stored in the application database 228. Once the intent determining unit 224 identifies the one or more required actions from the intent signals, the system of record unit 226 may service those actions based on information in the application database 228 associated with a property or associated resident information.

In some cases, the intent determining system may determine that no actions are available to satisfy the user's intent. In such cases, the intent determining unit 224 may identify that no actions are available to satisfy the user request. The user request may then be escalated and flagged within the application database 228 to prompt a human administrator to review the user request. The human administrator, for example, may be a property manager associated with the property management company of the property in which the user lives.

The required actions identified for the user request may include reference to data and/or one or more documents of associated with the user and/or the property associated with the user. This can include data from documents of the property management company, technical documents associated with the user's residence, or other documents that may assist in achieving the identified intent of the user.

The system of record unit 226 may be used when the application running on server 200 requires information associated with an action or requires a particular request to be made through another system of record that is separate from the application running on server 200. The databases and systems of record associated with a particular property or property management company may be identified during an initial onboarding process. These systems of record may include, for example, databases provided through applications and services such as Yardi®, MRIQ, Realpage®, Vantaca®, CINC Systems®, Appfolio®, etc. During onboarding, an administrator of the property and/or property management organization may identify systems of record, including connection information and username/password information or API credential information required to access data stored in the databases associated with those systems of records.

Optionally, user authentication data for a particular system of record can be stored by the server 200. For example, user authentication data for a particular user such as credentials (e.g. a username/password combination) may be stored and saved by a resident user of the system during a user onboarding process. For example, the username and password combination for a resident's electricity utility may be submitted and saved in the application database 228 so that the resident user can request their utility bills through the application on server 200.

The system of record unit 226 may make API requests, or may use a headless web browser or other form of automated request to the system of record. Alternatively or in addition, web hooks or database access may be used for integration with a system of record. This request to the system of record may be to gather information or data to satisfy the user request, to submit a request to the system of record (for example, to schedule an appointment for a plumber or other tradesperson). For example, the system of record unit 226 may make an API request based on the user request in order to create an appointment request for a plumber based on the user's identified need for a repairs to their residence.

The system of record unit 226 may include a listing of data and/or documents in a document corpus. The intent of the user request, and the associated actions, may require information to be provided or data to be provided in the response for the user. In this case, the system of record unit 226 may provide the information including a link to a relevant document or a summarization of relevant portions of the relevant document. The system of record unit 226 may use embeddings of the LLM system, and may relay the relevant documents to the LLM system for completion. The completion of the request may include preparing a unique answer for the user based on the context of their question.

The application database 228 may provide information about one or more systems of record. These systems of record may refer to connection information such as URLs, or other connection identifiers. The system of record connection information may further include authentication data such as property specific authentication data (e.g. usernames and passwords associated with the property) and/or user-specific authentication data (e.g. usernames and passwords or associated with the resident). The application database 228 may also include a corpus of data and/or documents associated with each property or each property management organization. These documents may be indexed, or otherwise pre-processed. For example, data from the documents may be extracted and/or summarized in the corpus of data. Optionally, the documents may be provided in summarized form, and a link to the document on the original system may be provided. For example, a request for the manual for the microwave oven in a residence may be provided to a user who asks about a particular feature of the microwave in their user request. The documents may include Portable Document Format (PDF) files, Word® files i.e., docx, text files, web pages, zip files. The documents may further include image files such as PNG files, JPEG files, GIF files, etc. The documents may be administrative documents related to a property, may be frequently asked question (FAQs), or other documents held by the property management company. Optionally, the data may be extracted from source documents including external reference locations. For example, the document corpus in the application database 228 may be updated regularly, for example, where a knowledgebase of a particular property is web scrapped in order to update the document corpus. This may be accomplished by storing one or more URLs in the application database 228 which the application server 230 may access on a regular basis in order to update the document corpus in the application database 228.

The Application Server 230 may be responsible for servicing user requests that are received, including providing functionality via the web/API unit 232. The Application Server 230 may be a commercially available server such as Apache Tomcat, Microsoft IIS, or Django or any other server that has a similar capability. The Application Server 230 may receive a user request through the web/API unit 232 from the communication unit 204 that includes a text-based portion.

The Application server 230 may provide one or more user interfaces such as those found in FIGS. 5A-5D. The server 106 (e.g. FIG. 1) may apply the methods described herein to generate and render a view at a display device of a user device 102. Alternatively, the user interfaces may be rendered using an application running on the user device 102. Alternatively, the user may interact with the property management system using telephone through an automated voice system, by text message using SMS, or using a chat application such as WhatsApp®. The Application Server 230 may further service requests from users using a generative model such as generated models 108. For example, the intent determining unit 224 may determine intent signals as well as one or more associated actions. The associated actions may operate the system of record unit 226 in order to engage external systems and make requests or gather information. The application server 230 may then send a request to one or more generative models to prepare a response to be provided to the user's request.

The model request may include a portion of the data in the user request as well as fixed prompt text. For example, the model request may include user-defined request data such as an input text portion of the user request, as well as the fixed prompt text. The model request may be made to one or more models and the model may reply with at least one corresponding model response. The Application Server 230 may then transmit a user response back to the user at the user device 102 based on the model response. The response from the systems of record may have additional processing provided. For example, a user request may fetch an account balance from a system of record and if the amount owed is over $100 the subsequent response to the user may be updated based on a property management rules document to interpret from the rules document and add an additional $15 late fee.

The Web/API Unit 232 may be a web-based application or Application Programming Interface (API) such as a REST (REpresentational State Transfer) API. The API may communicate in a format such as XML, JSON, or other interchange format. The Web/API unit 232 may be provided by the application server 230.

Figure 3:
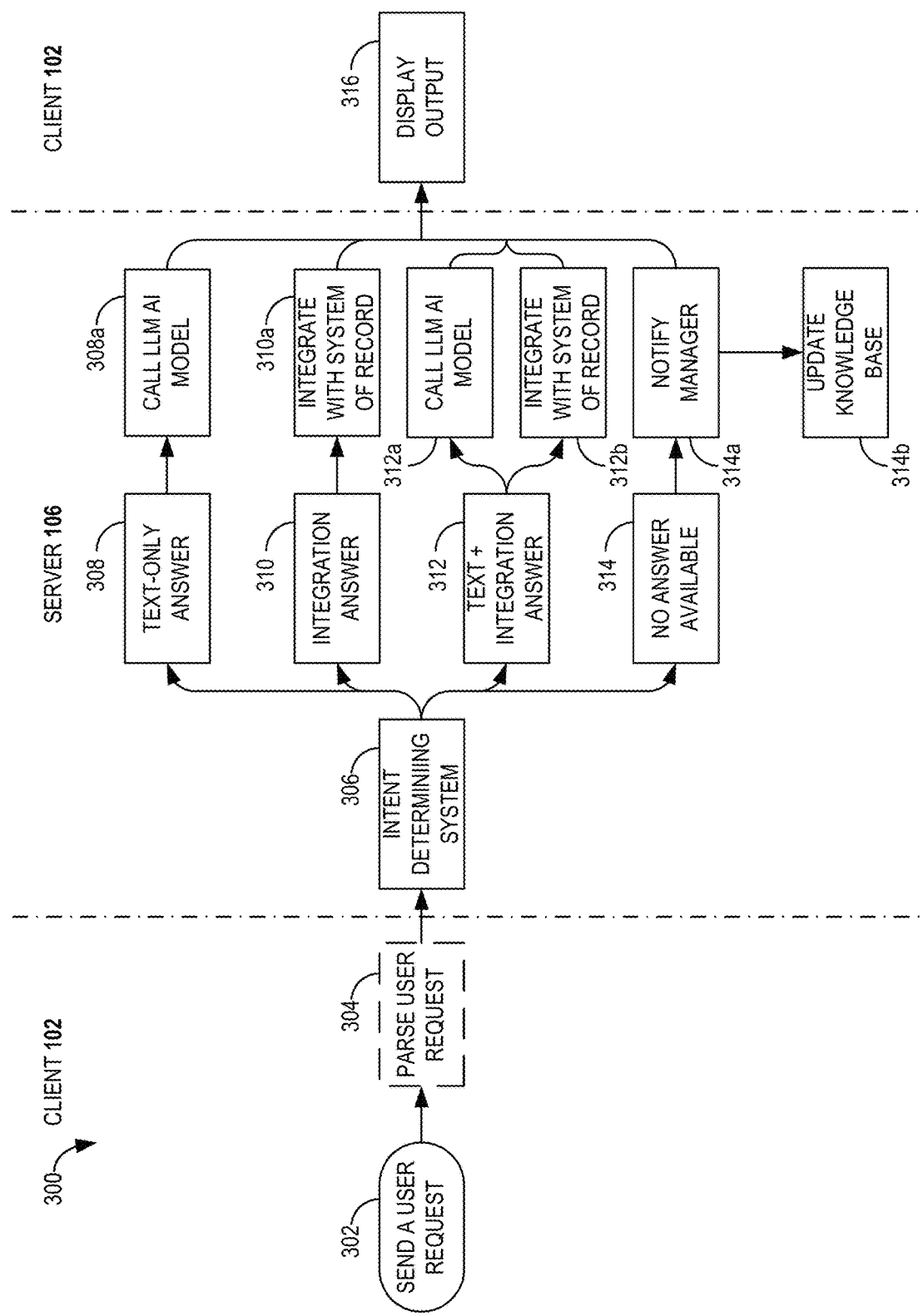
FIG. 3 shows a flowchart of an example method.

Referring next to FIG. 3, which shows a flowchart 300 of an example method for responding to a user request, including identifying intent and connecting to a system of record.

As shown, client 102 corresponds to actions performed by a user at a user device 102 and server 106 (see e.g. FIG. 1).

At 302, a user sends a user request on a user device. For example, the user may type a query in a text box on a user interface on a web page provided by server 106. Alternatively, the user may enter a query in a text box on a user interface on a user application running on user device 102. Alternatively, the user may send a text message query via SMS to a phone number provided by their property management company. The query may be a user asking a question related to their residence. For example, they may ask for assistance with a plumbing issue in their unit, or alternatively, may ask about a function on their microwave oven. For example, the user may ask "How does the popcorn function work on the microwave", or "I have a leak under my sink and I need assistance to fix it".

Optionally, the user may send a request 302 that is multi-modal including images and text together. For example, the user may ask the property management system "Is this decoration acceptable to put on my balcony" along with a picture of the decoration, prior to the purchase of the decoration. In the case of a multi-modal request, the intent determining system may adjust the requests to LLM model to include a multi-modal request that includes text and the images provided by the user.

Optionally, prior to processing the user's intent at intent determining system 306, the image may be processed by an image model that may describe the contents of the image using a model that can recognize elements of the image provided by the user.

The user request may be parsed 304 in order to pre-process it for the server 106. The pre-processing may also include metadata from the user device, such as location, time, user information such as email address or phone number, etc.

At 306, the server receives the user request. Server pre-processing may be performed upon receipt, including looking up user account information based on the user information identified in 304 (e.g. email address, phone number, etc). The server pre-processing may allow the user account information to be provided as context to the intent determining unit. The user account information may supplement the request to the intent determining system, and subsequently the request to one or more LLM systems (see FIG. 3-312a and FIG. 3-310a). The server can use the intent determining unit to process the request using an intent determining system. The intent determining system may process the user request and may identify one or more intent signals. These intent signals can include an intent signal identifying one or more systems of record, and an intent signal requiring an action. The intent signal identifying one or more systems of record may be determined by the intent determining system from a list of intents associated with the system of record (e.g. check account balance, submit work order, etc.). These intents may vary with each system of record depending on intent availability. Intents may be customized for a particular property management organization. For custom intents, an NLU engine (e.g. Dialogflow) can be used to determine the corresponding intent which may then trigger the corresponding action and/or integration. These individual intents may be trained using the content of the chats conducted by prior residents. The intent signal requiring an action may be determined where the intent determining system is itself an LLM system. In this case, a list of intents may be provided to the LLM system, and prompt the LLM system it to determine intent before it tries to generate an answer. If the LLM system determines the intent is from the list of intents that require an integration action, then the LLM system may return to the property management system a notification that may trigger an integration action with the identified system of record system. Based on the intent signals, the server 106 can identify the type of response that may be required to satisfy the user intent. This may include a text-only answer 308, an integration answer 310 that may require a request to a system of record, a text and integration answer 312 that combines both the text only answer 308 and the integration answer 310, or no answer available 314.

A text-only answer 308 may be serviced by searching and index, or requesting information from a document corpus on a system of record. This may include access a document or link stored in the application database, and collecting information that may be used subsequently. This may include using an embeddings model which identifies similar portions in the document corpus in the application database. Once the data or information is collected, it may be sent to a generative model 308a in order to create a user response to be sent to the user. This may include using a completions model through the LLM system to generate the response. The text-only answer 308 may also identify answers or documents within a property knowledgebase in the application database.

An integration answer 310 may send requests and collect data from a system of record using the system of record unit. This may include connecting via an integration 310a with a system of record. This could include a web-based integration, a database integration, or another type of integration as known. Having received the integration response, the response to the user may correctly address the specific nature of the question based on the integration response. For example, if the user has a balance due (info received from the integration response) and the current date is past the payment window as required by the property rules, the response may be updated to add a late fee is due.

A text and integration answer 312 combines both a text-only answer 308 and an integration answer 310. This can include an integration request with a system of record 312b and a request to a generative model 312a to prepare a user response.

If no answer is available 314 to the identified intent, then the user request may be flagged in the database for review by a property management administrator 314a. The property management administrator may login to the web interface provided by the server 106 and manually submit a response to the user request. In response to a low confidence rating provided along with the response to the user request, the property management administrator may flag the answer to be used to retrain one or more models. The manually entered response from the property management administrator can be saved 314b in the application database to update the knowledgebase for a property or property management company and may be used in the future to train internal models and to respond to user requests including similar intent signals.

At 316, the user response is provided to the user. The user response can be output into a user interface so that the user can receive a response to their inquiry.

Figure 4:
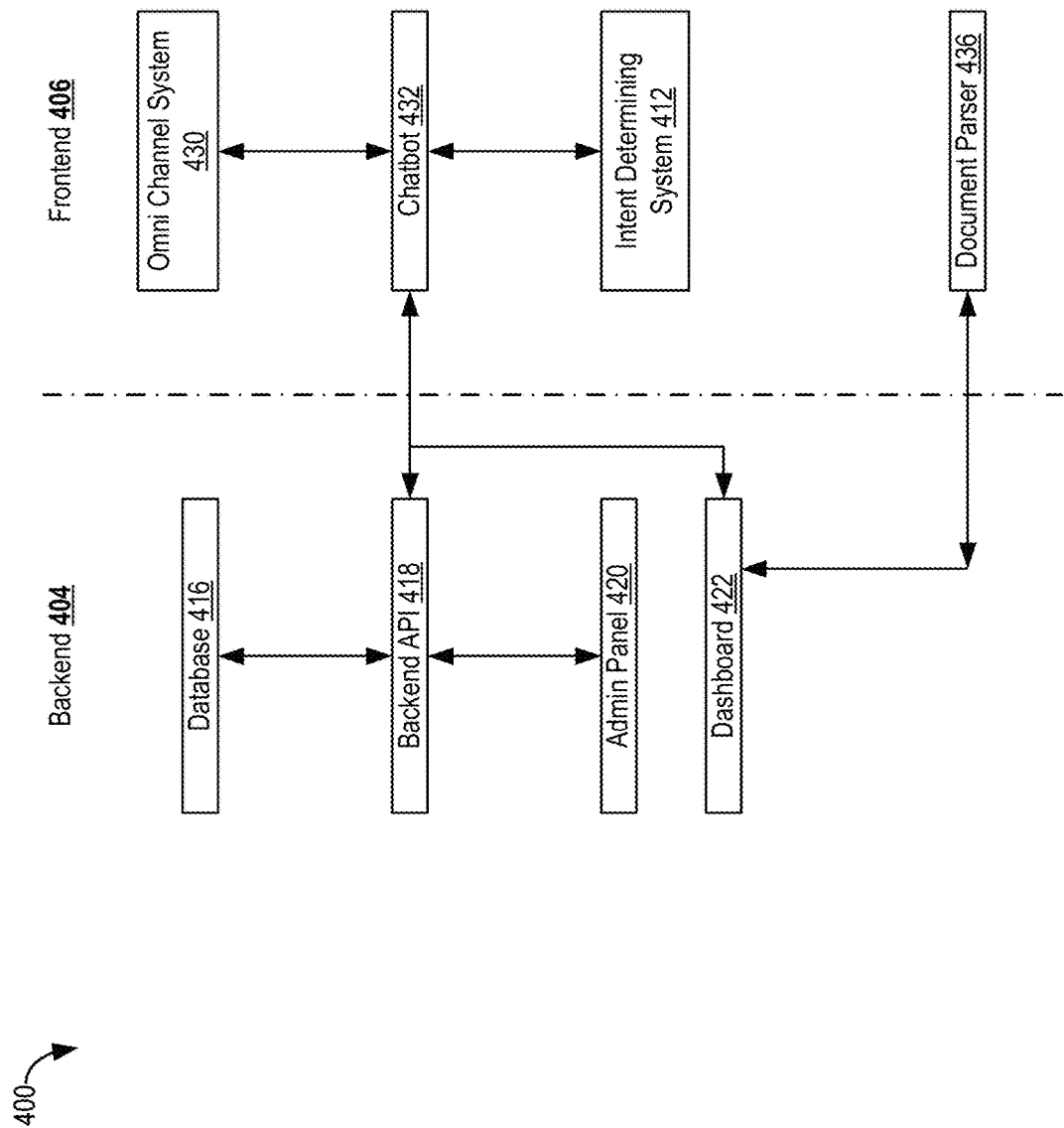
FIG. 4 shows another flowchart of another example method.

Referring next to FIG. 4, which shows a flowchart 400 of another example method of responding to a user query.

In the example of FIG. 4, frontend 406 includes a chatbot 432 that may be provided via a web interface, or an API interface. The API interface of the chatbot 432 may be connected to an SMS or MMS API such as Omni Chanel System 430 which provides for interaction with the present system using text messages/SMS. The Omni Channel System 430 may be, for example, Twilio®.

The Omni Channel System 430 may provide for different communication channels that can interface with the chatbot 432 of the frontend 406. This can include an email communication channel that enables interaction with the software application automatically via email. This can include directed emails to the platform, or email add-ins (for example, Outlook or Gmail add-ins) that can be used to interact with the software application using an existing email client. The Omni Channel System 430 may provide for multi-modal interactions with users, for example, where emails include image attachments and text, or where an MMS message includes an image.

The chatbot 432 may send user requests to the intent determining system 412.

The frontend 406 may also include a document parser 436 allowing administrators of property management organizations to streamline the ingestion of data from their systems of record or other document corpuses. This ingestion may include receiving databases, document corpuses, frequently asked questions (FAQs or Q and As), web sites, documents (such as those described above in the application database 228). The web sites may be stored by scraping the content of the website, or may be stored as a link that can be regularly compared for changes.

The backend 404 includes a database 416 (see e.g. application database 228 in FIG. 2), an API 418 (see e.g. Web/API unit 232), an administrator interface 420, a dashboard 422, and the self-service interface 424.

The administrator interface 420 may provide access for administrators of a property management organization, including manual review of user requests that have been flagged in the database 416.

The dashboard 422 may include analytics and a top-down view of the user requests for a property or an entire property management organization.

Referring next to FIGS. 5A-D together, there are shown example user interfaces 500a, 500b, 500c and 500d that may be displayed to a user of system 100.

These example user interfaces 500a-500d are displayed or output on a user device 502. The user interfaces may be either web user interfaces accessible via a browser or user interfaces provided in an application running on the user device 102. Alternatively, the user interfaces shown may be text, WhatsApp, or other interfaces where the user is communicating via another channel.

Figures 5A, 5B:
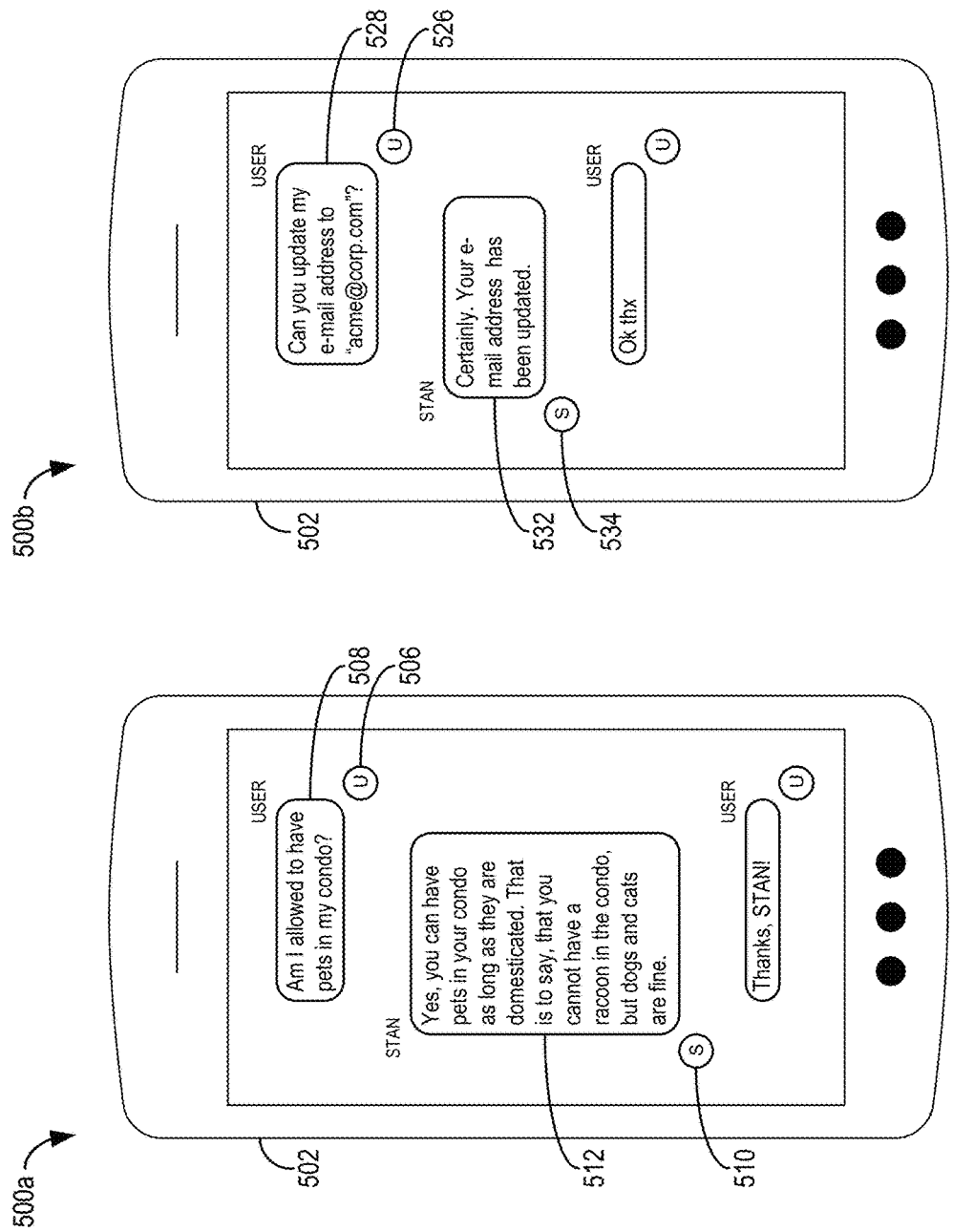
FIG. 5A-D show examples of user interfaces.

In FIG. 5A, a user 506 sends a user request 508 via a communication channel using a user device 502. The system may determine that the user request 508 requires a "text only answer."

The text-only answer 512 may be provided by the chatbot 510. The user request may be processed based on the method in FIG. 6, including the intent determining unit 224, the system of record unit 226, and finally, the application server 230 (see e.g. FIG. 2). The text-only answer may be determined based on the contents of the knowledgebase in the database 228, or a system of record. The user response may be generated using a generative model. Optionally, if the text-only answer cannot be answered, then the results of a web search such as from Google® may be provided.

In FIG. 5B, the user 526 sends a user request 528 via a communication channel using a user device 502. The system may determine that the user request 528 requires an "integration answer."

The integration answer 532 may be provided by the chatbot 534. The identified intent may indicate that a request be made to a system of record associated with the property or the property management organization. When the intent signals and associated actions indicate an integration answer is necessary, a request is submitted to the system of record to fetch information (e.g. a live account balance), create a record (e.g. submit a work order) or update/edit existing records (e.g. update a resident's e-mail address as shown in integration answer 532). User information may be used to authenticate the user's account at the system of record. This may include looking up the user's email address or phone number and identifying an account associated with the user.

Figure 5D:
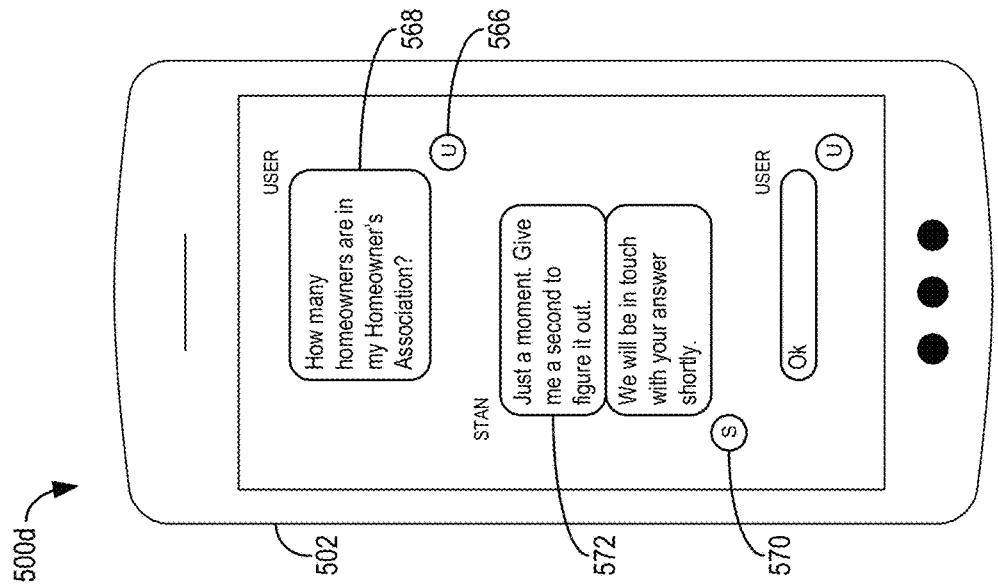
Figure 5C:
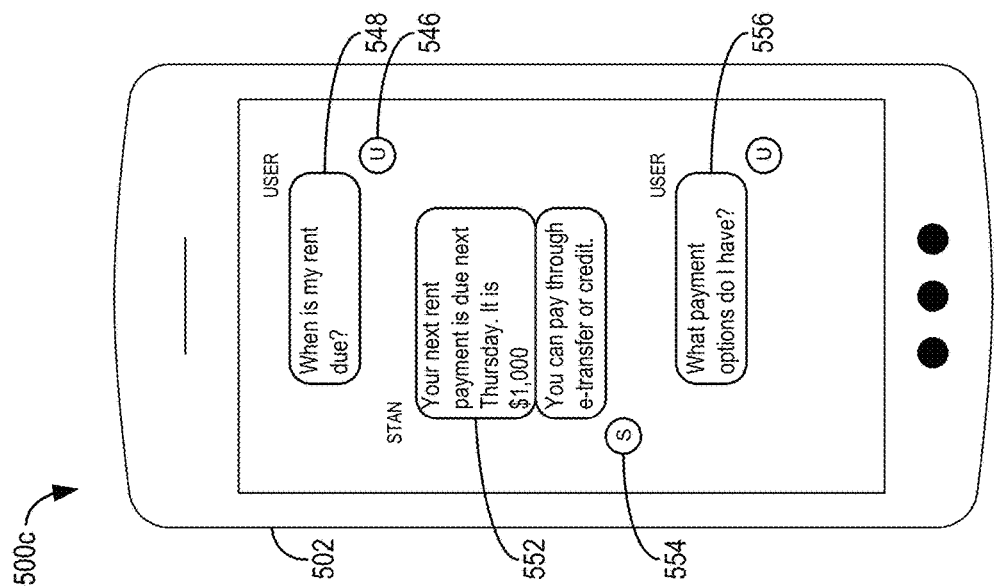

In FIG. 5C, the user 546 sends a user request 548 via a communication channel using a user device 502. The system may determine that the user request 548 requires an "text+integration answer."

The text+integration answer 552 may be provided by the chatbot 554. As noted herein, the response 552 includes a text answer portion in the form of payment options, and an integration answer portion in the form of the residents live account balance. This response 552 is identified based on the intent signals and the associated actions indicate this. The steps associated with both the text answer (e.g. FIG. 5A) and the integration answer (e.g. FIG. 5B) both apply in the generation of the response 552.

In FIG. 5D, user 566 sends a user request 568 via a communication channel using a user device 502. The system may determine that the user request 568 has "no answer."

The no available answer 572 may be provided by the chatbot 570. As noted herein, the response 572 may indicate that no answer is available in the knowledge base or through a system of record. In this case, the software application may flag the user request in the database and escalate the inquiry to an administrator of the property management organization. The administrator may receive a notification regarding the user request. When the administrator responds with the user response to the software application, the knowledge-base may be automatically updated, and the user response may be sent to the user.

Figure 6:
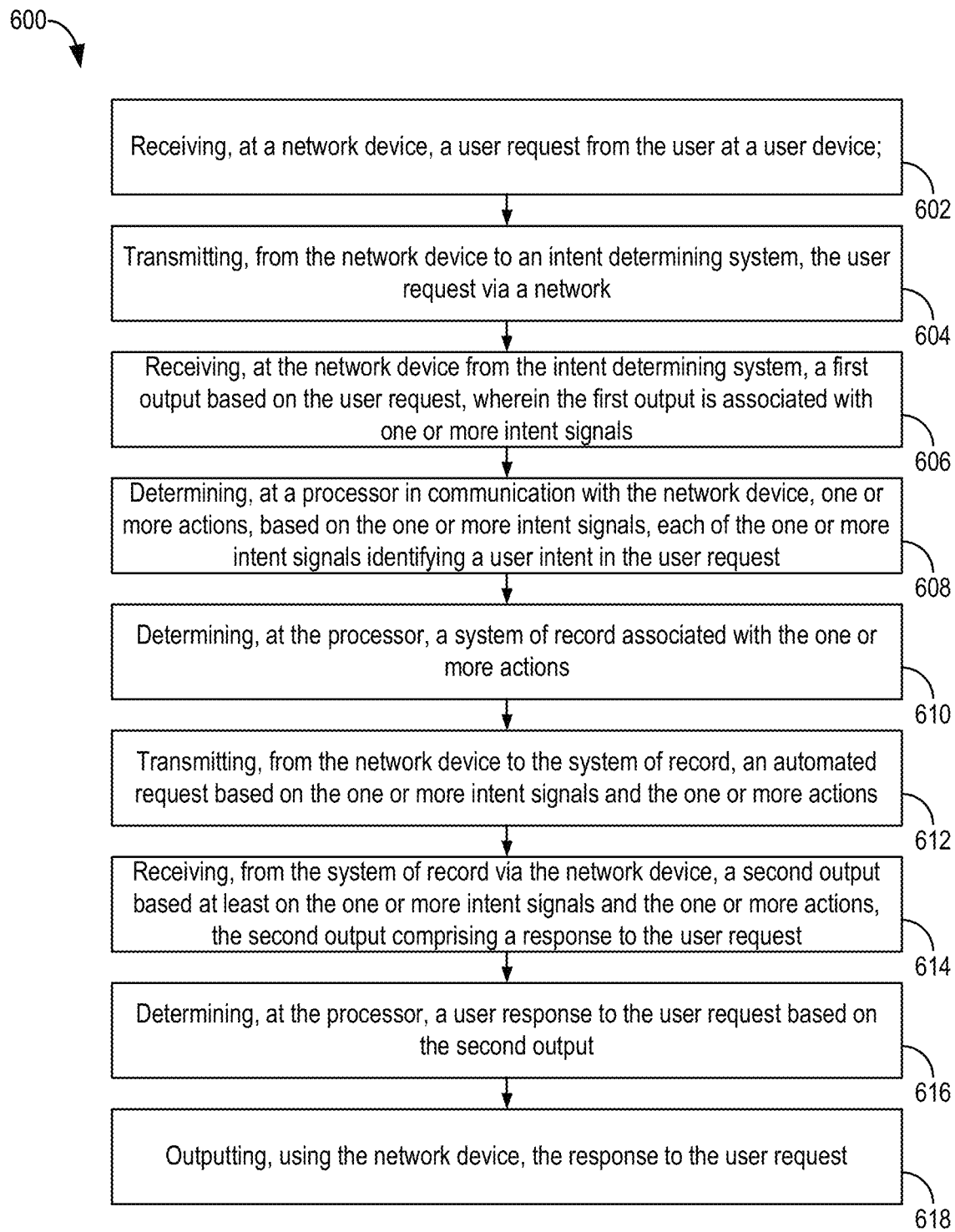
FIG. 6 shows a flowchart of another example method.

Referring next to FIG. 6, which shows a flowchart 600 of an example method of responding to a user request.

At 602, a network device receives a user request from a user at a user device.

At 604, the network device transmits to an intent determining system, the user request via a network.

At 606, the network device receives from the intent determining system, a first output based on the user request, wherein the first output is associated with one or more intent signals.

At 608, a processor in communication with the network device determines one or more actions, based on the one or more intent signals, each of the one or more intent signals identifying a user intent in the user request.

At 610, the processor determines a candidate system of record from the plurality of systems of record, the candidate system of record associated with the one or more actions.

At 612, the network device transmits to the candidate system of record, an automated request based on the one or more intent signals and the one or more actions.

At 614, the candidate system of record transmits to the network device, a second output based at least on the one or more intent signals and the one or more actions, the second output comprising a response to the user request.

At 616, the processor determines a user response to the user request based on the second output.

At 618, the response to the user request is output.

Figure 7:
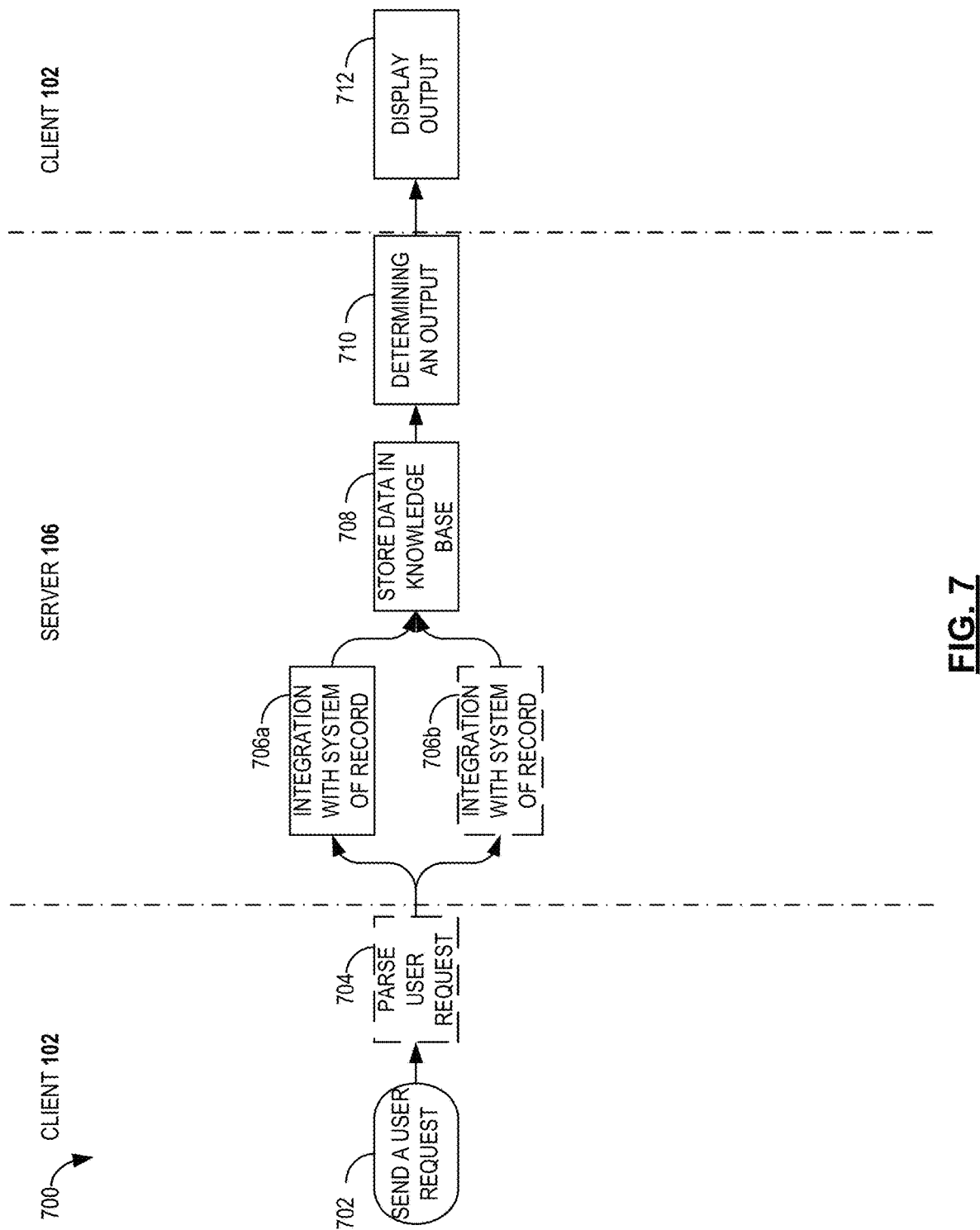
FIG. 7 shows a flowchart of another example method.

Referring next to FIG. 7, which shows a flowchart 700 of an example method for responding to a user request, including retrieving from one or more systems of record, data related to a user.

As shown, steps shown in conjunction with client 102 correspond to actions performed by a user at a user device 102 and server 106 (see e.g., FIG. 1).

At 702, a user can send a user request through a user device 102. The user can submit the user request in various ways, e.g. typing a query in a text box one a web page or user application, sending a text message query via SMS, sending an email etc.

The user request can include a user-defined request relating to a residential or commercial property associated with a user. The user-defined request may be a user asking a question related to their residence. For example, they may ask for assistance with a plumbing issue in their unit, or alternatively, may ask about a function on their microwave oven. For example, the user may submit a user request such as "How does the popcorn function work on the microwave", or "I have a leak under my sink and I need assistance to fix it".

Optionally, the user may send a multi-modal request 702 that includes both images and text. For example, the user may ask the property management system "Is this decoration acceptable to put on my balcony" along with a picture of the decoration, prior to the purchase of the decoration.

Optionally, an image included in the user request may be processed by an image model that may describe the contents of the image using a model that can recognize elements of the image provided by the user.

Optionally, the user request may be parsed 704 at the user device 102 in order to pre-process the user request for the server 106. For example, pre-processing the user request may result in including metadata from the user device, such as location, time, and/or user information such as email address or phone number, etc. along with the user request sent to the server 106.

The server 106 can then receive the user request 702 (along with any user data resulting from device pre-processing of the user request). The server 106 can receive the user request through an omnichannel interface. The user request can be transmitted along a specific communication channel (e.g. email, SMS, directly through a user app) and be received through the omnichannel interface.

Server pre-processing may be performed upon receipt of the user request. This can include determining user identification data for the user based on pre-processing of the user request. The user identification data can be determined based on user information received from device pre-processing of the user request. Alternatively or in addition, the user identification data can be determined based on server pre-processing of the user request.

Server pre-processing can include identifying user-specific access data stored in a database accessible to the server 106. For example, the server 106 may identify stored user account information based on the user information identified in 704 (e.g., email address, phone number, etc.). The server pre-processing may use the user identification data and/or user account information to identify systems of records having user-specific data related to the user or the residential or commercial property associated with the user (e.g., rent amount, rent payment date, etc.).

At 706a and 706b the server can immediately retrieve user-specific data from one or more record system databases storing the systems of record associated with the user. The user-specific data can be retrieved by the server 106 immediately or substantially immediately once a connection is established between the user device and the server. For example, the server 106 may initiate a user request session in response to receiving the user request. The user-specific data can then be retrieved by the server 106 once the user request session has been initiated.

The user-specific data can be retrieved without (or at least prior to) any assessment of the intent or required actions specified by the user request. That is, the user-specific data can be retrieved regardless of whether the user request requires information to be stored.

For example, the user request 702 may ask "When is my rent due?" and the server 106 can, in addition to retrieving from a system of record the amount of date of the rent that is due, also retrieve any information related to the user (e.g., amount of rent due, email address, forms related to the user) in response to receipt of the user request. For simplicity, only two systems of record 706a and 706b are shown. It will be clear that any number of systems of records may be used to retrieve data related to the user.

The user-specific data retrieved from a system of record may be from one or more systems of record. For example, at 706a the server may retrieve user-specific data related to a user's rent from one system of record and at 706b the server may retrieve user-specific data related to a user's email address from a different system of record.

At 708, the user-specific data retrieved from the one or more record system databases can be temporarily stored in a local database accessible to the server 106 (and models 108) as a user-specific knowledge base.

For example, the entire user-specific knowledge base can be stored as prompt context data usable to prompt a generative model to assist in responding to the user request. The prompt context data can be included in a model prompt transmitted by the server 106 to a generative model during a process of responding to a user request. In some cases, the entirety of the user-specific data retrieved from the one or more record system databases can be included as prompt context data transmitted to a generative model.

The server 106 can include the prompt context data along with a model prompt for a generative model to determine a user response (and/or request response data) in response to the user request. The prompt context data may be stored in a memory accessible to the generative model for a specified period (e.g. the duration of the user request session, a predefined period such as 24 hours after the user request session is completed, etc.).

Optionally, the user-specific data retrieved from the one or more systems of records may containers pointers to a subset of the user-specific data in those systems of record instead of the data itself. For instance, user-specific data that is immutable or changes infrequently (e.g. full name, address, demographic information) may not be retrieved in its entirety but instead a pointer to access that user-specific data can be stored in the local user knowledge base for the user request session.

Optionally, the infrequently changing user-specific data may be retrieved in a user request session if a specified period of time has elapsed since a previous user request session. This may ensure that even the infrequently changing data (e.g. user address) can be confirmed and/or updated for the specific user request session.

When the user device disconnects from the server (e.g. when the user request session is terminated), the user-specific data can removed from the temporary knowledge base. Alternatively, the user-specific data may remain in the temporary knowledge base stored by the local database for a period of time following the user request session. This may allow the server to access the temporary knowledge base to provide a response to a subsequent user request from the same user.

At 710, a request data response is determined, based on the user request. The request data response can include includes at least some of the user-specific data from the one or more system of records that is stored in the temporary knowledge base. The request data response can be used to determine a user response for the user request.

For example, if a user requests to "update an email address" and "change credit card information" in the same user request, the server may use the user-specific data temporarily stored in the knowledge base at 708 to generate a user response. The user response may include data from a single file or document related to the user or may be a combination of data from multiple files or documents related to the user depending on the nature of the user request 702.

At 712, the user response can be provided to the user. The server can transmit the user response to the user device using the same communication channel over which the user request was received. The user device may then display the user response through a user interface so that the user can receive a response to their inquiry.

Figure 8:
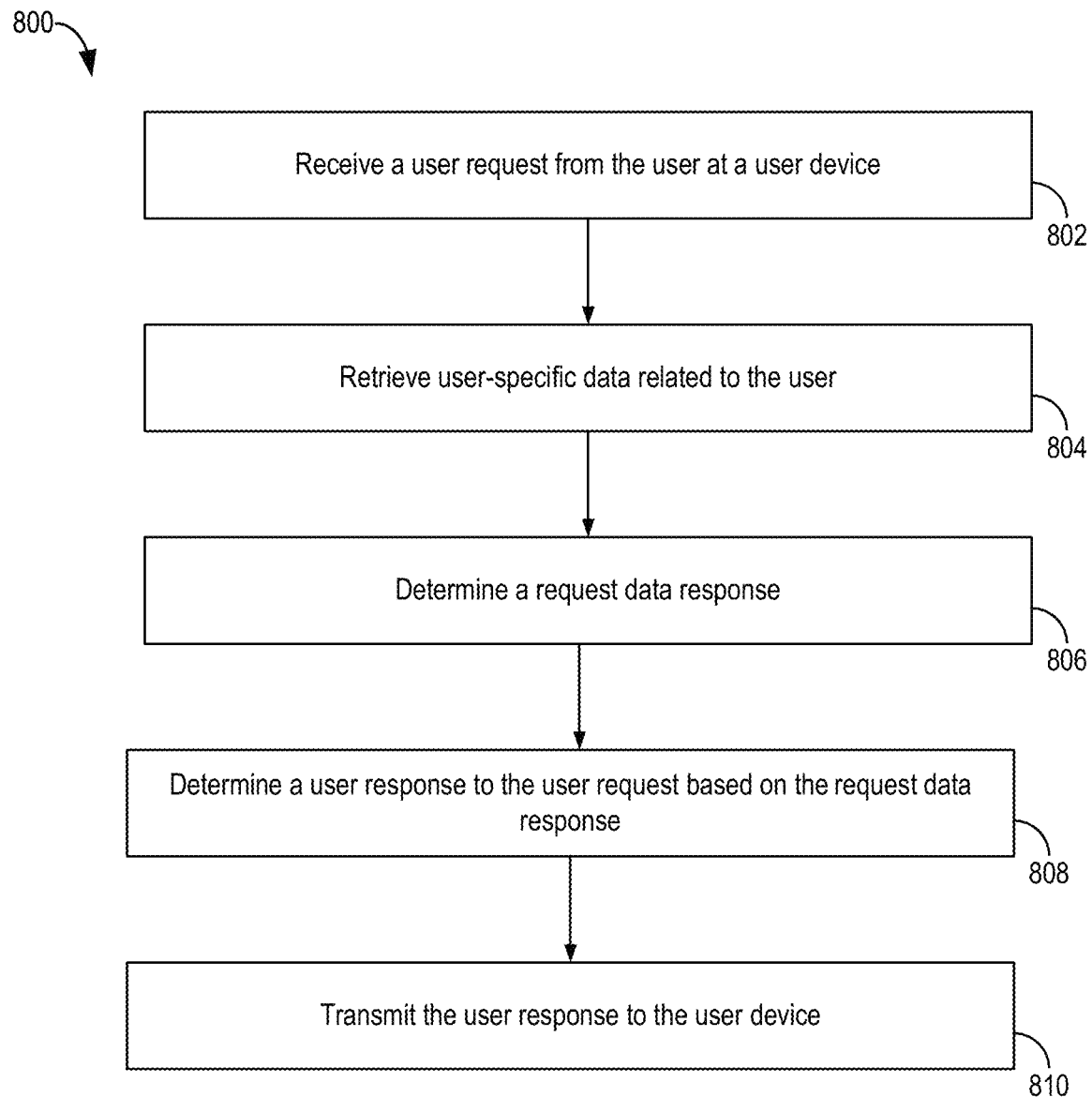
FIG. 8 shows a flowchart of another example method.

Referring to FIG. 8, which shows a flowchart 800 of another example method of responding to a user request.

At 802, a user request can be received from a user device. The user request can be received by the server processor over a first communication channel. For example, the first communication channel may be an email communication channel, an SMS channel, an application interface etc. accessible to the user device. The user request can be received through an omnichannel interface that allows the server processor to receive user requests from a plurality of different communication channels and/or message types.

The user request can include a user-defined request relating to a residential or commercial property associated with a user associated with the user request. The identity of the user may be defined directly in the user request. Alternatively, user identification data for the user can be determined based on pre-processing of the user request. The pre-processing of the user request can occur at the user device and/or the server. The pre-processing may include additional information in or with the user request, such as metadata related to the user device that is usable to determine the identity of the user.

Optionally, the specific property associated with the user request may be defined directly in the user request. Alternatively or in addition, the property may be determined based on identity of the user (e.g. through the user identification data) and a property associated with that user.

At 804, user-specific data related to the user and/or the property can be retrieved from one or more systems of record. The user-specific data can be temporarily stored in a local database accessible to the server processor. This can position any data associated with the user that may be relevant the user request such that it can be readily queried and retrieved to determine the user response.

The user-specific data can include all user-related data and/or property related data (related to the property associated with the user) that is accessible to the server processor. The user-specific data can be retrieved prior to performing any analysis of the content of the user request. That is, the user-specific data can be retrieved prior to determining an intent associated with the user request.

Optionally, the server processor can authenticate the user prior to retrieving the user-specific data. For instance, the server processor may require the user device to provide user credentials prior to retrieving the user-specific data.

Optionally, the user authentication process can be a channel dependent authentication process. That is, the particular process for authenticating a user can vary depending on the communication channel from which the user request was received.

For example, a user request may be transmitted to the server 106 through the omnichannel interface via an email communication channel. The server 106 may authenticate the user identity by performing a universal email lookup in the systems of record accessible to the server 106 to identify the user associated with the email address used in the email communication channel. The server can also identify related property data, such as a knowledge base associated with the property associated with that user.

For example, a user request may be transmitted to the server 106 through the omnichannel interface via a call or text communication channel. The server 106 may authenticate the user identity by performing a universal phone number lookup in the systems of record accessible to the server 106 to identify the user associated with the phone number used to transmit the user request.

For example, a user request may be transmitted to the server 106 through the omnichannel interface via a web chat communication channel. The server 106 may authenticate the user identity by checking an account number associated with the user of the web chat in the systems of record accessible to the server 106 to identify the user associated with the phone number used to transmit the user request.

Optionally, the authentication process may vary depending on the organization associated with the requesting user. For instance, a particular property management organization may require the server 106 to perform additional authentication steps (e.g. requiring a user to input a password or perform a multi-factor authentication method) prior to providing access to user-specific data.

Optionally, additional authentication steps may be used depending on the communication channel from which a user request was received. For instance, additional authentication steps may be used where a particular communication channel (e.g. phone call) is known to be subject to security vulnerability such as impersonation or spoofing for example.

The server processor may initiate a user request session in response to receiving the user request. The local data storing the user-specific data can be associated with the user request session. This can allow the user to provide subsequent requests or further clarifying requests within the user request session while all user-specific data remains readily and rapidly accessible to respond to new or modified user requests without having to retrieve additional data.

At 806, a request data response can be determined based on the user request. The request data response generally includes the data accessible to the server processor that is usable to respond to the user request. The request data response can include at least some of the user-specific data stored in the local database.

The request data response can be determined based on one or more specific user intents defined by the user request. The one or more specific user intents can be determined by providing the user request and the user identification data as inputs to one or more intent determining processors. The intent determining processors can be configured to use at least one of a natural language processing model or a large language model to determine an intent associated with the user request. The server processor can determine request-related data required to respond to the user request based on the one or more specific user intents. The request-related data can be identified from the user-specific data stored in the local database. The request data response can then be defined using the request-related data identified by the server.

At 808, a user response to the user request can be determined based on the request data response from 806. The user response can be defined to provide the user with a response to their request that provides the retrieved data necessary to respond to the request, although in a user-friendly form. This can include summarizing the content of the request data response. This can also include generating a natural language response to the user that summarizes and/or highlights the request-related data necessary to satisfy the user request. For example, the server processor can prompt a large language model to generate the user response based on the request data response as described herein above.

At 810, the user response can be transmitted to the user device. The server processor can transmit the user response using the same communication channel.

Optionally, the server processor may terminate the user request session following the transmission of the user response to the user device. For example, the user request session may terminate after the user response has been transmitted and a predefined time period has elapsed. This may allow storage and processing resources to be re-allocated to respond to additional user requests.

Optionally, the user request session can terminated by the server processor in response to receiving a session complete message from the user device over the first communication channel. For example, the server provider may transmit a message to the user device prompting the user to indicate whether their request has been satisfied. The user may provide a session complete response indicating that the request has been satisfied and no further requests are required at this time.

Alternatively, the server processor may receive a subsequent user request from the user device during the user request session. The server processor may then repeat steps 806-810 in order to respond to the user request. Step 804 need not be repeated, as the user-specific data has previously been retrieved to the local database during the user request session. The server processor can determine subsequent request data response based on the subsequent user request, determine a subsequent user response, and transmit the subsequent user response to the user device over the same communication channel.

Optionally, the server processor may remove the user-specific data from the local database following termination of the user request session. This can again provide additional resources to respond to additional user requests from other users.

In some examples, the server processor can receive an additional user request from a second user device. The server processor can then repeat process 800 in respect of the additional request.

The additional user request can include an additional user-defined request relating to an additional residential or commercial property associated with an additional user associated with the additional user request. The server processor can initiate an additional user request session in response to the additional user request. The server processor can determine additional user identification data for the additional user based on pre-processing of the additional user request. The server processor can retrieve additional user-specific data related to the additional user or the additional residential or commercial property associated with the additional user from the one or more record system databases storing the systems of record. The server processor can temporarily store the additional user-specific data in an additional local database accessible to the server processor during the additional user request session.

The server processor can provide the user request session and the additional user request session concurrently. The server processor can provide a plurality of user request sessions concurrently to allow the server processor to respond to user requests from a greater number of users.

Optionally, the processor generates a database, the database comprising a corpus of documents associated with a property.

Optionally, the method may further include: determining, at the processor in communication with the network device, that no actions match the associated one or more intent signals; transmitting, to a manager user, a notification via a manager network device; receiving, from the manager user, a second output via a manager network device, comprising a response to the user request; and transmitting, to the database via the network, the second output.

Optionally, the determining, at a processor in communication with the network device, one or more actions may comprise at least one of: retrieving a status update, updating an existing record, creating a work order, creating a budget, and summarizing a contract.

Optionally, the method may further include: outputting, using the network device, a notification when one or more of the actions is completed.

Optionally, the transmitting, from the network device to the candidate system of record, an automated request based on the one or more intent signals and the one or more actions may include using an application programming interface (API) call, a fetch and write program, and robotic process automation (RPA).

Optionally, the network device may include a text platform, an e-mail platform, a calling platform, a web-based platform, or an in-app messaging platform, e.g. an Omni Channel platform may be used to send and receive information from a variety of different communication channels as described herein.

Optionally, the user request may include a prompt related to property management.

Optionally, the receiving, from the candidate system of record via the network device, the second output, may include receiving information from a homeowner's association (HOA).

Optionally, the candidate system of record may be an enterprise resource planning system, a financial system, a document management system, an inventory management system, and a compliance system.

Optionally, the outputting at the network device, the response to the user request may include sending an e-mail, sending a message in a chatbot, or sending a message in a messaging platform.

The present invention has been described here by way of example only and the above discussed examples should be considered to be illustrative and not restrictive. Various modification, adaptations and variations may be made to these examples without departing from the scope of the invention, which is limited only by the appended claims.

The invention claimed is:

1. A computer-implemented method for responding to user queries requiring access to data stored in one or more systems of record from amongst a plurality of systems of record, the method comprising:
   receiving, by a server processor through an omnichannel interface, a user request from a user device over a first communication channel, the user request including a user-defined request relating to a residential or commercial property associated with a user associated with the user request;
   determining, by the server processor, user identification data for the user based on pre-processing of the user request;
   retrieving, from one or more record system databases storing the systems of record, user-specific data related to the user or the residential or commercial property associated with the user using the user identification data, wherein at least one remote record system database of the one or more record system databases is external to and remote from the server processor;
   temporarily storing the user-specific data in a local database locally accessible to the server processor;
   determining, by the server processor, one or more specific user intents defined by the user request, wherein the one or more specific user intents are determined by providing the user request and the user identification data to one or more intent determining processors configured to use at least one machine learning model to determine an intent associated with the user request;

determining, by the server processor, a request data response based on the one or more specific user intents, the request data response comprising at least some of the user-specific data stored in the local database;

determining, by the server processor, a user response to the user request based on the request data response; and transmitting, by the processor to the user device, the user response to the user request using the first communication channel;

wherein the user-specific data is retrieved prior to determining the one or more specific user intents.

2. The method of claim 1, further comprising:
authenticating the user prior to retrieving the user-specific data.

3. The method of claim 1, further comprising:
initiating, by the server processor, a user request session in response to receiving the user request; and
associating the local database storing the user-specific data with the user request session.

4. The method of claim 3, further comprising:
terminating the user request session following the transmission of the user response to the user device.

5. The method of claim 4, wherein the user request session is terminated by the server processor in response to receiving a session complete message from the user device over the first communication channel.

6. The method of claim 4, further comprising removing the user-specific data from the local database following termination of the user request session.

7. The method of claim 3, further comprising:
receiving, by the server processor, a subsequent user request from the user device during the user request session;
determining, by the server processor, subsequent request data response based on the subsequent user request, the subsequent request data response comprising at least some of the user-specific data stored in the local database;
determining, by the server processor, a subsequent user response to the subsequent user request based on the subsequent request data response; and
transmitting, by the server processor to the user device, the subsequent user response to the subsequent user request using the first communication channel.

8. The method of claim 3, further comprising:
receiving, by the server processor, an additional user request from a second user device, the additional user request including an additional user-defined request relating to an additional residential or commercial property associated with an additional user associated with the additional user request;
initiating, by the server processor, an additional user request session in response to the additional user request;
determining, by the server processor, additional user identification data for the additional user based on pre-processing of the additional user request;
retrieving, from the one or more record system databases storing the systems of record, additional user-specific data related to the additional user or the additional residential or commercial property associated with the additional user; and
temporarily storing the additional user-specific data in an additional local database accessible to the server processor during the additional user request session.

9. The method of claim 8, wherein the server processor provides the user request session and the additional user request session concurrently.

10. The method of claim 1, further comprising:
determining, by the server processor, request-related data required to respond to the user request based on the one or more specific user intents, wherein the request-related data comprises the at least some of the user-specific data stored in the local database; and
determining the request data response using the request-related data.

11. The method of claim 1, wherein the processor is configured to provide, in addition to the user request and the user identification data, at least some of the user-specific data retrieved from the one or more record system databases to the one or more intent determining processors to determine the one or more specific user intents.

12. A system for responding to user queries requiring access to data stored in one or more systems of record from amongst a plurality of systems of record, the system comprising:
a processor; and
a non-transitory storage memory having stored thereon a local database in communication with a server processor;
wherein the processor is configured to:
receive through an omnichannel interface, a user request from a user device over a first communication channel, the user request including a user-defined request relating to a residential or commercial property associated with a user associated with the user request;
determine user identification data for the user based on pre-processing of the user request;
retrieve from one or more record system databases storing the systems of record, user-specific data related to the user or the residential or commercial property associated with the user using the user identification data, wherein at least one remote record system database of the one or more record system databases is external to and remote from the server processor;
temporarily store the user-specific data in the local database;
determine one or more specific user intents defined by the user request, wherein the one or more specific user intents are determined by providing the user request and the user identification data to one or more intent determining processors configured to use at least one machine learning model to determine an intent associated with the user request;
determine a request data response based on the one or more specific user intents, the request data response comprising at least some of the user-specific data stored in the local database;
determine a user response to the user request based on the request data response; and
transmit, to the user device, the user response to the user request using the first communication channel;
wherein the processor is configured to retrieve the user-specific data prior to determining the one or more specific user intents.

13. The system of claim 12, wherein the processor is configured to:

authenticate the user prior to retrieving the user-specific data.

14. The system of claim 12, wherein the processor is configured to:
   initiate a user request session in response to receiving the user request; and
   associate the local database storing the user-specific data with the user request session.

15. The system of claim 14, wherein the processor is configured to:
   terminate the user request session following the transmission of the user response to the user device.

16. The system of claim 15, wherein the processor is configured to terminate the user request session in response to receiving a session complete message from the user device over the first communication channel.

17. The system of claim 15, wherein the processor is configured to remove the user-specific data from the local database following termination of the user request session.

18. The system of claim 14, wherein the processor is configured to:
   receive a subsequent user request from the user device during the user request session;
   determine a subsequent request data response based on the subsequent user request, the subsequent request data response comprising at least some of the user-specific data stored in the local database;
   determine a subsequent user response to the subsequent user request based on the subsequent request data response; and
   transmit, to the user device, the subsequent user response to the subsequent user request using the first communication channel.

19. The system of claim 14, wherein the processor is configured to:
   receive an additional user request from a second user device, the additional user request including an additional user-defined request relating to an additional residential or commercial property associated with an additional user associated with the additional user request;
   initiate an additional user request session in response to the additional user request;
   determine additional user identification data for the additional user based on pre-processing of the additional user request;
   retrieve, from the one or more record system databases storing the systems of record, additional user-specific data related to the additional user or the additional residential or commercial property associated with the additional user; and
   temporarily store the additional user-specific data in an additional local database accessible to the server processor during the additional user request session.

20. The system of claim 19, wherein the processor is configured to provide the user request session and the additional user request session concurrently.

21. The system of claim 12, wherein the processor is configured to:
   determine one or more specific user intents defined by the user request, wherein the one or more specific user intents are determined by providing the user request and the user identification data as inputs to one or more intent determining processors operable to use at least one of a natural language processing model or a large language model to determine an intent associated with the user request; and
   determine request-related data required to respond to the user request based on the one or more specific user intents, wherein the request-related data comprises the at least some of the user-specific data stored in the local database; and
   determine the request data response using the request-related data.

* * * * *